Figure 1:
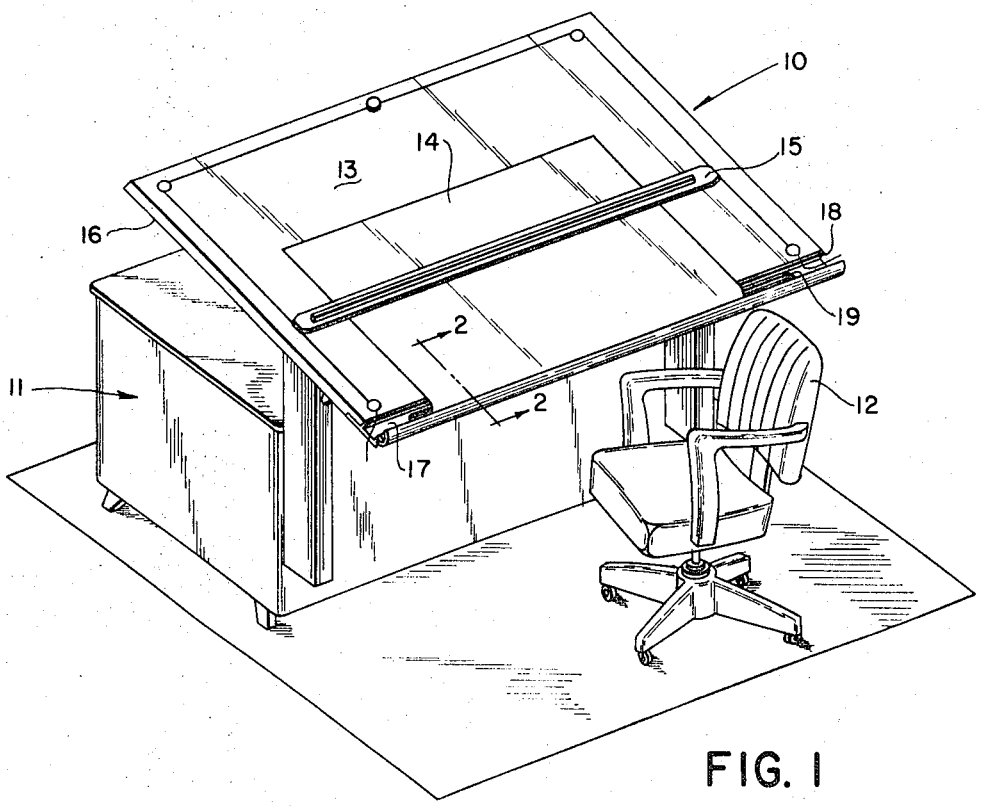
Figure 2:
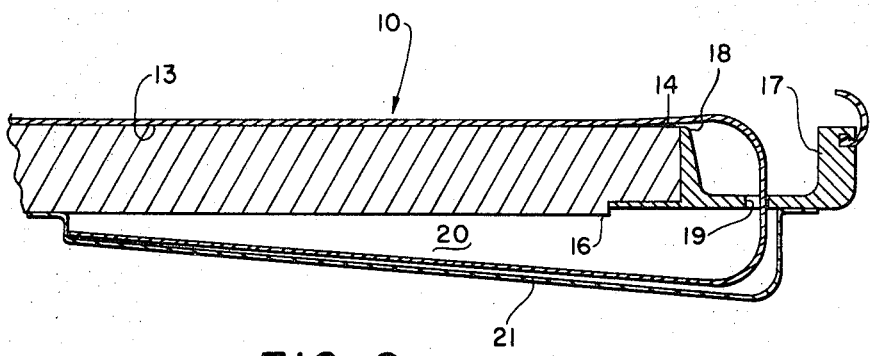

DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED MAY 4, 1971

886 O.G. 5

T886,008
DRAWING BOARD

James E. McConkey, 901 Elmgrove Road,
Rochester, N.Y. 14624

Filed June 8, 1970, Ser. No. 44,462
Int. Cl. A47b *27/00, 63/04*
U.S. Cl. 312—23
1 Sheet Drawing. 6 Pages Specification

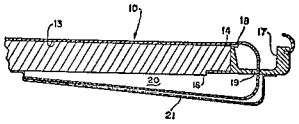

A drawing board is provided with a workface, an underface and a tray for holding drawing utensils or the like. The tray is arranged with respect to the workface so that a sheet of drawing paper supported on such workface, when overlapping an edge of the drawing board, will be partially disposed in such tray. A slot in the tray is of dimensions suitable for passage therethrough of the supported drawing sheet and communicates with a chamber located on the underface of the drawing board. Accordingly, a draftsman may remain seated at the drawing board and work on all areas of the supported sheet by feeding such sheet through the tray slot and into and out of the chamber.

May 4, 1971 J. E. McCONKEY T886,008

DRAWING BOARD

Filed June 8, 1970

JAMES E. McCONKEY
INVENTOR.

BY Steve W. Grembau
Robert W Hampton
ATTORNEYS